United States Patent [19]
Barcroft

[11] 3,854,545
[45] Dec. 17, 1974

[54] POWER TRANSFER UNIT FOR TANDEM WHEELS

[76] Inventor: Frederick J. Barcroft, 7700 S.W. Garden Home Rd., Portland, Oreg. 97223

[22] Filed: Apr. 20, 1973

[21] Appl. No.: 352,896

[52] U.S. Cl. ............................................. 180/24.12
[51] Int. Cl. ............................................. B62d 61/10
[58] Field of Search .................... 180/24.12, 1 A, 74

[56] References Cited
UNITED STATES PATENTS

| | | | |
|---|---|---|---|
| 1,897,944 | 2/1933 | Carter | 180/24.12 |
| 2,717,654 | 9/1955 | Andersen | 180/24.12 |
| 3,372,767 | 3/1968 | Keegan | 180/24.12 |
| 3,439,765 | 4/1969 | Keegan | 180/24.12 |
| 3,724,581 | 3/1973 | Terrell | 180/24.12 |

FOREIGN PATENTS OR APPLICATIONS

| | | | |
|---|---|---|---|
| 270,351 | 10/1966 | Australia | 180/24.12 |
| 1,364,137 | 5/1964 | France | 180/24.12 |

*Primary Examiner*—David Schonberg
*Assistant Examiner*—Terrance L. Siemens
*Attorney, Agent, or Firm*—Lee R. Schermerhorn

[57] ABSTRACT

A friction wheel is forced into engagement with the tires on driving and non-driving wheels on a tandem axle vehicle so as to drive the non-driving wheel temporarily from the driving wheel when conditions of inadequate traction on the road are encountered. The friction wheel is mounted on a free-swinging arm so as to bear with equal force against the two tires and accommodate movements of the tandem axles relative to each other and relative to the vehicle. The swinging arm is mounted on a support member which forms one member of a parallelogram linkage, allowing up and down movements of the friction wheel in a vertical plane. A double-acting air cylinder operates in a downward direction on the support member to press the friction wheel against the tires and make the device operative and operates in an upward direction to retract the friction wheel and make the device normally inoperative. The operating mechanism is incorporated in a housing which is bolted to the outside of a longitudinal frame member of the vehicle. There is a pair of such devices on opposite sides of the vehicle which operate independently of each other.

4 Claims, 4 Drawing Figures

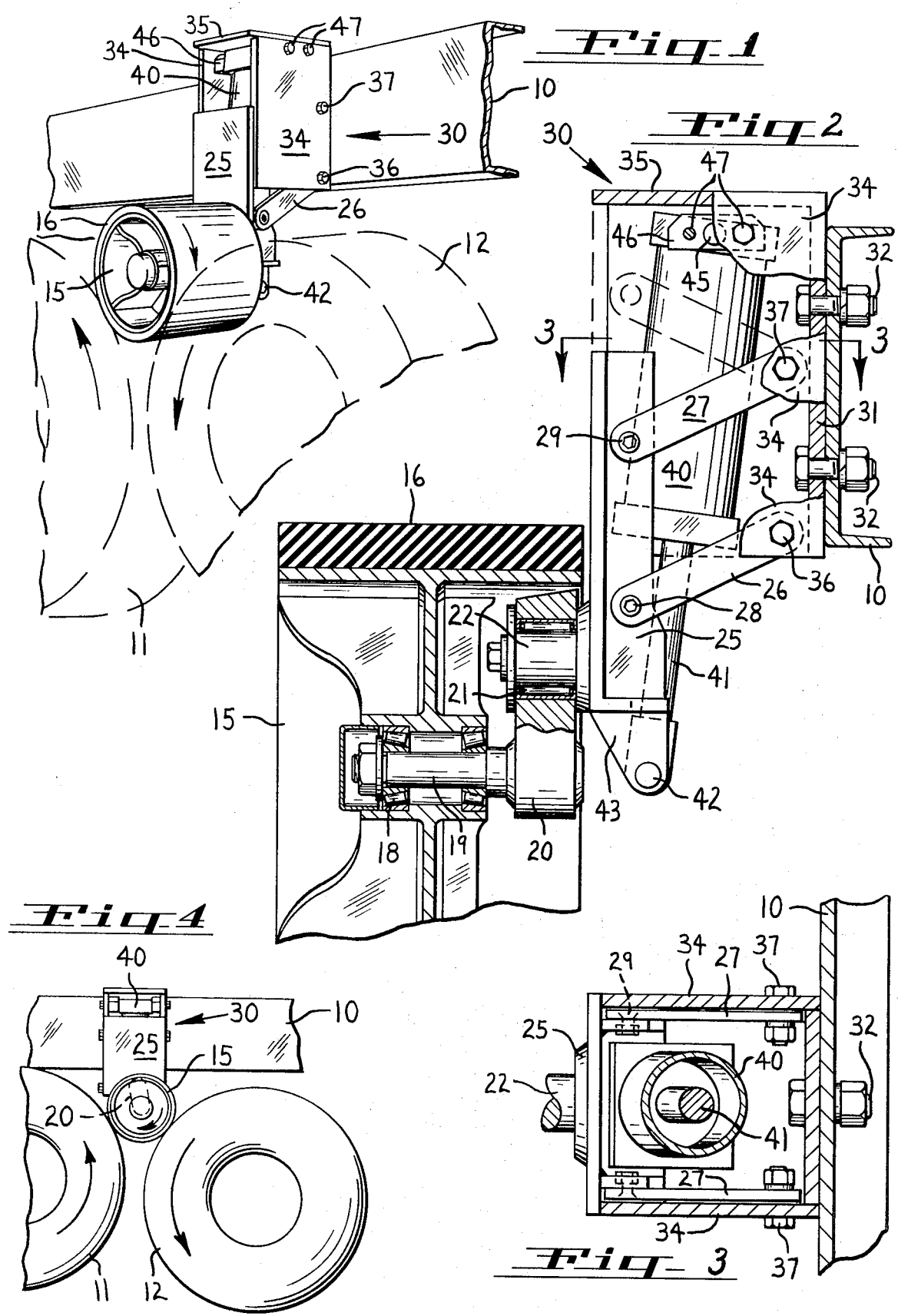

POWER TRANSFER UNIT FOR TANDEM WHEELS

BACKGROUND OF THE INVENTION

This invention relates to a power transfer wheel for temporarily appying torque to a non-driving wheel on a tandem axle vehicle when conditions of poor road traction are encountered.

Devices heretofore proposed for this purpose have, in general, been too complicated aand expensive to be practical. They have generally been axle-mounted and otherwise limited to certain types of running gear. Another undesirable feature common in such mechanisms is the use of transverse shafts and other parts interconnecting a pair of such devices on opposite sides of the vehicle. This introduces complications on uneven ground surfaces and impairs the effectiveness of the two units on the opposite sides of the vehicle. Also, complicated mechanisms of this type obviously add to the first cost and to the problems of installation.

Objects of the present invention are, therefore, to provide an improved power transfer wheel for tandem axle vehicles having a dead axle adjacent to a live axle, to provide a power transfer wheel of simple and inexpensive construction which is easy to install, to provide a power transfer wheel which may be installed as an accessory device on substantially all tendam axle vehicles, and to provide a device of the type described which is simply bolted on the outside of a longitudinal frame member of the vehicle without any transverse parts extending across or under the vehicle and without any parts connected to the wheel axles.

SUMMARY OF THE INVENTION

The present device is embodied in two identical units, one for the left side of the vehicle and one for the right side. The operating mechanism in each unit is incorporated in a housing which is bolted to the outside of a longitudinal side frame member of the vehicle above and between its tandem axles without any parts extending across or under the vehicle and without any parts connected to the vehicle axles. A parallelogram linkage within the housing provides vertical movement for a support member carrying a vertical pivotal arm having a horizontal stub shaft on which the friction wheel is mounted.

A double-acting air cylinder in the housing operates in a downward direction to extend the support member and friction wheel downward between the tires of the adjacent wheels on the tandem axles so that the non-driven road wheel may temporarily be driven frictionally from the driven road wheel. The pivotal arm on the support member allows the friction wheel to bear with equal force against the two tires and accommodate movements of the vehicle axles relative to each other and relative to the vehicle. Operation of the air cylinder in an upward direction raises the friction wheel to a normal retracted and inoperative position.

The invention will be better understood and additional objects and advantages will become apparent from the following description of the preferred embodiment illustrated on the accompanying drawing. Various changes may be made, however, in the details of construction and arrangement of parts and all such modifications within the scope of the appended claims are included in the invention.

BRIEF DESCRIPTION OF THE DRAWING

FIG. 1 is a fragmentary perspective view showing the power transfer wheel embodying the invention mounted on a tandem axle vehicle;

FIG. 2 is a vertical sectional view of the structure in FIG. 1, with parts shown in elevation;

FIG. 3 is a view on the line 3—3 in FIG. 2; and

FIG. 4 is a side elevation view of the structure in FIG. 1.

DESCRIPTION OF THE PREFERRED EMBODIMENT

FIG. 1 shows a typical installation on a tandem axle truck having a longitudinal frame member 10 on the left side of the vehicle. Frame 10 may be supported on any common type of running gear having a pneumatic tired wheel 11 on a live or driving axle and an adjacent pneumatic tired wheel 12 on a dead or non-driving axle. Only the left side of the vehicle is shown. The right side is similar having a longitudinal frame member 10, a driving wheel 11 and a non-driving wheel 12. Since the opposite sides of the vehicle are the same, it is not necessary to further describe or illustrate the other side.

A transfer wheel 15 is covered on its periphery with a rubber friction material 16 which is adapted to drive the wheel 12 from the wheel 11 when the wheel 15 is forced downward into firm frictional engagement with both tires on the wheels 11 and 12. In a truck with dual wheels, the transfer wheel 15 may have sufficient axial length to fully engage both duel wheels if desired but, ordinarily, contact with the inner wheels of the dual units is sufficient for the purpose.

Transfer wheel 15 is mounted on bearings 18 for rotation on a horizontal stub shaft 19 extending from the lower end of a vertical pivotal arm 20. The upper end of arm 20 is mounted on bearings 21 for rotation on a horizontal pin 22 extending from a vertically movable support member 25.

Support member 25 forms one side of a parallelogram linkage having a pair of lower link arms 26 and a pair of upper link arms 27. Arms 26 are pivotally connected with pins 28 and upper arms 27 are connected with pins 29 in support member 25. Arms 26 and 27 are contained in a housing 30 having a back plate 31 secured to the outer face of vehicle side frame member 10 by bolts 32. Housing 30 further includes a pair of opposite side plates 34 and a top plate 35.

The inner ends of arms 26 and 27 are pivotally mounted on bolts 36 and 37 in side plates 34. Pins 28 and 29 have countersunk heads flush with the faces of arms 26 and 27 so that arms 26 and 27 will slide on the inner faces of side plates 34 to stabilize the arms and prevent any movement of these arms and support member 25 in a direction longitudinal to the vehicle. Pin 22 is thereby constrained to movement in a vertical plane transverse to the vehicle between the tandem axles and wheels 11 and 12.

A double-acting air cylinder 40 has a piston rod 41 connected to a pin 42 in a pair of ears 43 on the lower end of support member 25. On the upper end of cylinder 40 a pair of trunnions 45 provide pivotal support for the cylinder in a pair of bearing blocks 46. Each bearing block 46 is secured to one of the side plates 34 by a pair of screws 47. Cylinder 40 extends between the pairs of link arms 26 and 27.

Cylinder 40 is powered by the conventional compressed air system on the truck which is used to operate the brakes and other devices. By means of connections in the upper and lower ends of cylinder 40 and a manual valve in the cab of the truck, the driver may admit air pressure to the upper end of cylinder 40 to press transfer wheel 15 down between the tires of the driven and non-driven wheels 11 and 12, causing the latter to be driven temporarily in areas where the road traction is inadequate.

For normal driving the valve is manipulated to admit air pressure to the lower end of cylinder 40, raising the transfer wheel 15 to an upper retracted position out of engagement with both wheels 11 and 12. FIG. 2 shows the parts in lowermost position with piston rod 41 fully extended downward slightly below its operating position shown in FIG. 1. In retracted position, the upper end of support member 25 abuts or substantially abuts top plate 35 on the housing 30.

FIG. 4 illustrates the free swinging pivotal movement of arm 20 to accommodate up and down movements of the tandem axles on uneven ground or road surfaces.

Thus, the present device is of simple and economical construction and is adapted for mounting on substantially all tandem axle vehicles. All that is required is the drilling of holes in frame member 10 to receive the bolts 32. The two devices on opposite sides of the vehicle are entirely independent of each other without any parts extending across or under the vehicle and without any parts requiring attachment to an axle. The device is of symmetrical construction whereby any unit may be installed on either the left or right side of the vehicle.

In addition to use on tandem axle trucks, the device is also applicable to certain tractor and semi-trailer combinations where the semi-trailer has a fifth wheel axle brought into close relationship with the driving axle of the tractor vehicle.

Having now described my invention and in what manner the same may be used, what I claim as new and desire to protect by Letters Patent is:

1. A power transfer wheel unit for frictionally driving a road wheel on a dead axle from a road wheel on a drive axle in a tandem axle vehicle suspension, comprising a vertical plate adapted for mounting on an outside vertical face of a longitudinal frame member of the vehicle, link arms pivotally supported from said plate, a support member pivotally mounted on said link arms, said plate, link arms and support member forming a parallelogram linkage for vertical movement of said support member, a fluid pressure cylinder having a piston connected with said support member, a horizontal pivot pin on said support member, a vertical arm pivotally mounted on said pivot pin, a horizontal stub shaft on said vertical arm, and a friction wheel on said stub shaft having an operative position engaging tires on both of said road wheels and having an inoperative position retracted away from said tires, said unit being wholly mounted on said outside face of the vehicle frame member.

2. A power transfer wheel as defined in claim 1, said parallelogram linkage being movable in a vertical plane transverse to the vehicle between said two axles.

3. A power transfer wheel for frictionally driving a road wheel on a dead axle from a road wheel on a drive axle in a tandem axle vehicle suspension, comprising a housing having a vertical back plate adapted for mounting on the frame of the vehicle and having a pair of vertical side plates perpendicular to said back plate, link arms pivotally mounted on said side plates and movable along and laterally stabilized by the inside surfaces of said side plates within said housing, a support member pivotally mounted on said link arms, said plate, link arms and support member forming a parallelogram linkage for vertical movement of said support member, a fluid pressure cylinder having a piston connected with said support member, a horizontal pivot pin on said support member, a vertical arm pivotally mounted on said pivot pin, a horizontal stub shaft on said vertical arm, and a friction wheel on said stub shaft having an operative position engaging tires on both of said road wheels and having an inoperative position retracted away from said tires.

4. A power transfer wheel as defined in claim 3 including bearing blocks on said side plates, and trunnions pivotally supporting said cylinder in said bearing blocks.

* * * * *